US006078592A

United States Patent [19]

Spiero

[11] Patent Number: 6,078,592

[45] Date of Patent: Jun. 20, 2000

[54] DAB RECEIVER, APPARATUS AND METHOD FOR A FORMAT CONVERSION OF A DAB DATA SEQUENCE

[75] Inventor: Richard C. Spiero, Eindhoven, Netherlands

[73] Assignee: U.S. Philips Corporation, New York, N.Y.

[21] Appl. No.: 08/724,390

[22] Filed: Oct. 1, 1996

[30] Foreign Application Priority Data

Oct. 4, 1995 [EP] European Pat. Off. .............. 95202664

[51] Int. Cl.[7] .................................. H04J 3/24; H04J 3/06

[52] U.S. Cl. .......................................... 370/474; 370/510

[58] Field of Search .................................... 370/464, 470, 370/471, 472, 473, 474, 210, 203, 350, 503, 509, 510; 375/316, 365, 366, 367, 368, 369

[56] References Cited

U.S. PATENT DOCUMENTS

| | | | |
|---|---|---|---|
| 5,483,686 | 1/1996 | Saka et al. | 455/182.2 |
| 5,483,690 | 1/1996 | Schroder | 375/350 |
| 5,692,016 | 11/1997 | Vanselow | 375/344 |
| 5,748,686 | 5/1998 | Langberg et al. | 375/367 |
| 5,751,774 | 5/1998 | Wang | 375/367 |

OTHER PUBLICATIONS

DAB452 "Digital Audio Broadcasting Test Receiver", For information contact: Philips DAB452 BAB Test Receiver, Philips Consumer Electronics, Advanced Development Centre, Broadcasting Laboratory, P.O. Box 80002, 5600 JB Eindhoven, The Netherlands.

*Primary Examiner*—Ajit Patel
*Assistant Examiner*—Brian Nguyen
*Attorney, Agent, or Firm*—Edward W. Goodman

[57] ABSTRACT

A DAB receiver, an apparatus and a method for converting a first sequence of data having a fixed frame structure, wherein locations within the frame are reserved for predetermined data types, into a second sequence of data, having a different frame structure. The data belonging to the respective data types are grouped in separate sequences with a frame type identifier attached to the sequences for identifying the different sequences. This allows an easy identification of the different sequences of data within the second sequence without the need of prior knowledge of the exact location of the sequences within the second sequence. An example of such a conversion is the conversion of the channel decoder output of a DAB receiver into a format suitable for embedding in the IEC958 format.

27 Claims, 2 Drawing Sheets

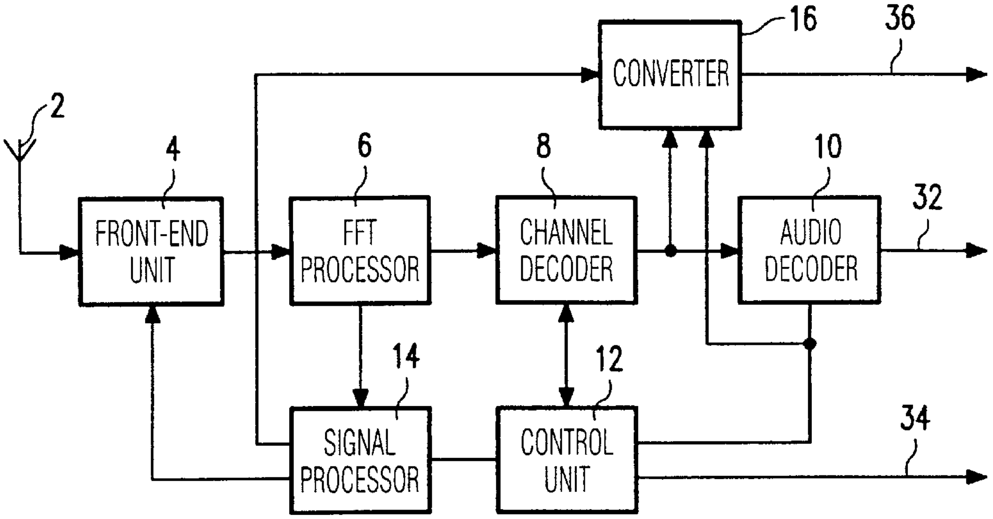
FIG. 1
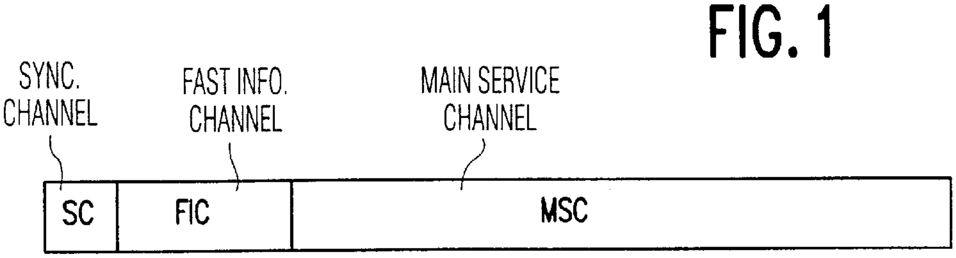
FIG. 2
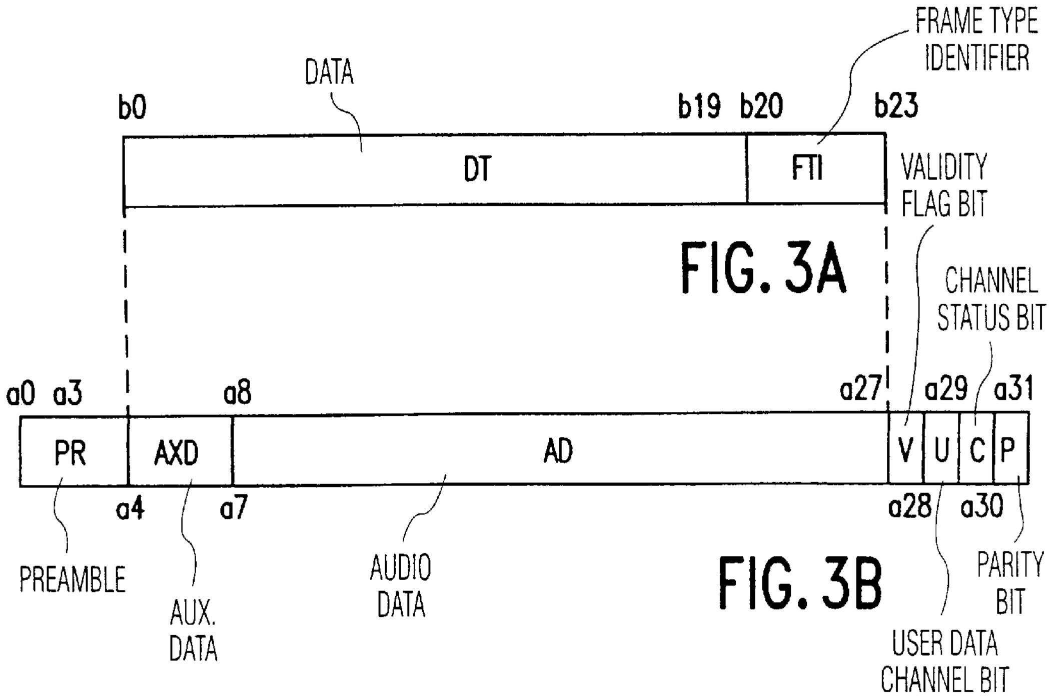
FIG. 3A
FIG. 3B

DAB RECEIVER, APPARATUS AND METHOD FOR A FORMAT CONVERSION OF A DAB DATA SEQUENCE

BACKGROUND OF THE INVENTION

1. Field of the Invention

The invention relates to a receiver for receiving a Digital Audio Broadcast signal, comprising means for decoding a received DAB signal into a first sequence of data, organized in frames of a first type, said frames comprising a plurality of data types at predetermined locations within the frame.

The invention further relates to an apparatus and a method for converting a first sequence of data into a second sequence of data.

2. Description of the Related Art

A DAB receiver according to the preamble is known from a folder "DAB452 Digital Audio Broadcasting test receiver", published by Philips Consumer Electronics, The Netherlands, February 1995.

In the known DAB receiver, a received DAB signal is frequency converted and demodulated in a Fast Fourier Transform device, de-interleaved and decoded into a DAB data sequence, organized in frames of a first type, said frames comprising a plurality of data types at predetermined locations within the frame. The output data of the channel decoder may comprise the whole de-interleaved and decoded DAB data sequence or only a part of this sequence. This output data is regarded here as the first sequence of data and is available on an external interface of the DAB receiver for supplying it to peripheral devices for further processing. This means that in the case of the whole DAB data sequence being available, peripheral devices need to have knowledge of the structure of the DAB format for decoding the correct information within the first sequence. In the case of only a part of the DAB data sequence being available, peripheral devices still need to have knowledge of the type of data being available. This makes a peripheral device rather complex. Furthermore, the frame format of the first sequence of data is not universally used in the digital domain: it is only used for DAB. This makes the interface of the DAB receiver to peripheral devices non-standard, which is undesirable in applications, wherein a variety of peripheral devices are required to communicate with each other.

SUMMARY OF THE INVENTION

An object of the present invention is to provide a DAB receiver, an apparatus and a method for converting data contained in the first sequence into a more readily accessible format.

A receiver according to the invention is characterized in that the receiver further comprises means for converting the first sequence of data into a second sequence of data, organized in frames of a second type, a frame length of the first type of frames being different from a frame length of the second type of frames, said converting means being coupled to the decoding means and being arranged for:

- disassembling the first sequence into at least two separate sequences of data, each of the separate sequences of data being reserved for a predetermined data type,
- dividing the separate sequences into frames of the second type and,
- arranging the separate sequences into frames of the second type, each frame having a frame type identifier for identifying the separate sequences within the second sequence, and further assembling the second sequence out of the separate sequences.

By dividing the first sequence into separate sequences, each separate sequence being reserved for a particular data type, and dividing the separate sequences over the frames of the second sequence, and further adding identifiers to the frames in the second sequence, the separate sequences can be identified within the second sequence without the need of having knowledge of the exact location of the data types in the second sequence. This reduces the complexity of a peripheral device and it results in a second sequence which is more readily accessible.

An embodiment of the invention is characterized in that the converting means is arranged for adding a data type identifier to at least one of the separate sequences for identifying the data type in the separate sequence.

This allows the peripheral device to determine in a simple manner which data type is present in one of the separate sequences.

A further embodiment of the invention is characterized in that the second sequence comprises a plurality of packets, wherein a separate sequence comprises a packet, comprising a plurality of frames in the second sequence, a packet being identified by predetermined values of the frame type identifier, said packet having a header containing the data type identifier.

By arranging the data in packets, each packet comprising a header, only little overhead is used in the second sequence as not every frame in the second sequence needs to have data type identifier for identifying the data type to which the data belongs. This results in a high efficiency of the second sequence.

Another embodiment of the invention is characterized in that the second sequence comprises single data frames, identified by at least one further predetermined value of the frame type identifier, wherein each single data frame in the second sequence comprises data and a data type identifier.

By arranging the data in frames and adding a further identifier to the frames, decoding of the data is simplified, resulting in a less complex peripheral device.

An embodiment of the invention is characterized in that the converting means is arranged for adding a synchronization signal to the second sequence for signalling a start of a frame of the first type.

By adding a synchronization signal indicating the start of a frame in the first sequence, the peripheral device can determine which data in the second sequence belongs to the same frame of the first sequence.

An advantageous implementation of such an embodiment is characterized in that the synchronization signal is a frame having a frame type identifier with a predetermined value.

An embodiment of the invention is characterized in that a frame of the second sequence comprises at least 20 bits for data from the first sequence and at the most 4 bits for the frame type identifier, a total frame length being 24 bits. This results in a frame length which is a multiple of 8 bits and can therefore be processed more easily as most devices are arranged to process data in multiples of 8 bits. This frame length also allows the frame to embedded in a sub-frame according to the IEC958 standard, thereby allowing a further standardization of data communication between different devices.

An embodiment of the invention is characterized in that depending on a data type, a frame comprises 20 bits for data and 4 bits for the frame type identifier, or 22 bits for data and 2 bits for the frame type identifier. This allows more data to be put into a frame in cases where it is needed. For example, when data from a DAB receiver is converted into the second sequence, MSC data may not entirely fit into a frame having only 20 data bits. By reducing the frame type indicator and increasing the data field by two bits, this MSC data will fit into the second sequence.

An embodiment of the invention, wherein the receiver comprises means for decoding data, embedded in the DAB signal, is characterized in that the converting means is arranged for adding the decoded data supplied by the means for decoding data as a separate sequence to the second sequence.

By this measure, it is possible to put even that data, which is not readily present in the output data of the channel decoder, in an accessible place within the second sequence. An example of this is the TII data, which is not part of the first sequence, but is encoded in the null symbol of the DAB signal.

A further embodiment of the invention is characterized in that the decoded data is PAD data.

A further example of data, which is not readily accessible from the first sequence, is the PAD data, which is put together with the audio information in the first sequence. In the second sequence it will normally also be associated with the audio information. This requires a peripheral device to comprise an audio decoder for retrieving the PAD data. As a DAB receiver is equipped with an audio decoder, the PAD data is already available in the receiver. By adding the PAD data as a separate sequence to the second sequence, a peripheral device need no longer decode the audio information together with the PAD data for retrieving the PAD data, but it can find the PAD data directly in the second sequence. This simplifies the retrieval of PAD data out of the second sequence considerably.

An embodiment of the invention is characterized in that a frame of the second sequence is embedded in a IEC958 sub-frame and in that the converting means are arranged for inserting the separate sequence comprising PAD data into a User Data channel in the IEC958 subframe.

In the IEC958 format the User Data channel can be used at will. By using the User Data channel for the PAD data, no regular frames in the second sequence need to be sacrificed for the addition of the PAD data to the second sequence.

BRIEF DESCRIPTION OF THE DRAWINGS

The above object and features of the present invention will be more apparent from the following description of the preferred embodiments with reference to the drawings, wherein:

FIG. 1 is a diagram of an embodiment of a receiver for receiving digital symbols according to the invention;

FIG. 2 is a diagram of a DAB transmission frame;

FIG. 3A is a diagram of a frame of the second sequence according to an embodiment of the invention;

FIG. 3B is a diagram of an IEC958 sub-frame;

DESCRIPTION OF THE PREFERRED EMBODIMENT

Figure 4:
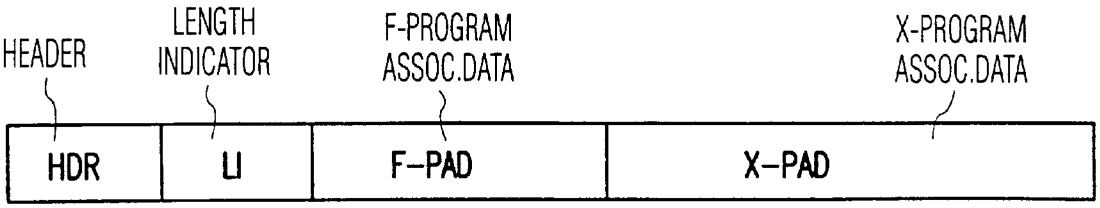
FIG. 4 is a diagram of an example of the structure of a PAD message for use in a receiver according to the invention.

FIG. 1 is a diagram of an embodiment of a receiver for receiving digital signals according to the invention. A receiving antenna 2 is connected to a first input of the receiver. The input of the receiver is connected to an front-end unit 4. An output of the front end unit 4 is connected to an input of an FFT processor 6. An output of the FFT processor 6 is connected to an input of a channel decoder 8.

A receiver for receiving digital signals can be used in the Digital Audio Broadcast system (DAB). An OFDM signal, comprising a plurality of carriers, on which plurality of carriers digital signals are modulated, is received by the receiver and amplified and frequency converted in the front-end unit 4. The output signal of the front-end unit 4 is then applied to the FFT processor 6 for demodulation to obtain the digital signals. At the output of the FFT processor 6 coded and interleaved signals are available. The FFT processor 6 also provides information to a signal processor 14 for synchronization of the front-end 4. The signal processor can also retrieve information from the FFT processor 6 regarding the field strength of the received transmissions and the identification of the transmitters, the Transmitter Identification Information or TII. This TII is present in a Null symbol at the start of each DAB frame. The signals at the output of the FFT processor 6 are de-interleaved and decoded by the decoder 8 to obtain the reconstructed digital signals. An audio decoder, for example the Philips SAA2500, is coupled to the output of the decoder 8 for decoding those digital signals comprising audio frames. At a first output, the audio decoder 10 provides Program Associated Data 36 or PAD, which is embedded in the audio frames. This PAD is supplied to a control unit 12 for further processing. At a second output, the audio decoder 10 provides audio data 32. The control unit 12 further controls the tuning of the receiver and the decoding in the decoder 8. The control unit 12 has an interface, comprising data 34 for receiving information from a user and to supply information to the user.

FIG. 2 is a diagram of a DAB transmission frame. The DAB frame comprises three fields: a Synchronization Channel SC, a Fast Information Channel FIC and a Main Service Channel MSC. The FIC comprises a number of Fast Information Blocks FIB. This number depends on the DAB transmission mode. In mode I, the DAB frame comprises 12 FIBs, in mode II, 3 FIBs and in mode III, 4 FIBs. The Main Service Channel comprises a number of Common Interleaved frames. This number also depends on the DAB transmission mode. In mode I, the DAB frame comprises 4 CIFs, in mode II, 1 CIF and in mode III, 1 CIF. In mode I the first 3 FIBs are assigned to the first CIF, the second 3 FIBs to the second CIF etc. The Main Service Channel is a time-interleaved data channel divided into a number of Subchannels, each having a Subchannel identification number SubChld, and each Subchannel may carry one or more service components, like audio, data, etc. The MSC is further divided into Capacity Units of 64 bits, and a Subchannel may occupy one or more of these Capacity Units. The organization of the Subchannels and their location in Capacity Units is transmitted in the FIC, among other items. For a detailed description of a DAB transmission frame, its structure and its contents, reference is made to document "Radio Broadcast Systems; Digital Audio Broadcasting (DAB) to mobile, portable and fixed receivers.", ETS 300 401, published by the European Telecommunications Standards Institute, Sophia Antipolis, 1995.

In the receiver of FIG. 1, the decoder 8 as presently used cannot decode the entire DAB sequence in total, but can only decode selected parts of the DAB data. For example, a user instructs the control unit 12 to supply the audio data from a program, for instance, "Radio 3", to the audio decoder 10. The control unit 12 then analyzes the FIC and determines on which Subchannel in the Main Service Channel the program of "Radio 3" is present. The control unit 12 then determines which Capacity Units are allocated to that Subchannel, for example, CU's 6, 7 and 8. The control unit 12 then instructs the decoder 8 to decode and output the decoded data from CU's 6, 7 and 8 and activate a first window signal to signal that the decoded data is present. The audio decoder 10 receives the data and the window signal and supplies the audio data on its output. Thus, the decoder 8 can only supply a limited amount of data. A future decoder 8 will be able to supply the complete decoded data from a DAB signal.

The receiver of FIG. 1 further comprises according to the invention converting means 16, having:

- a first input coupled to the output of the decoder 8 for receiving the first sequence of data, the sequence comprises either an entire DAB data sequence or at least a part of said DAB data sequence, depending on the decoder 8 as mentioned previously; and
- an output for supplying a second sequence of data 36, organized in frames of a second type, a frame length of the first type of frames being different from a frame length of the second type of frames, the second sequence comprising at least two separate sequences, each of the separate sequences being reserved for a different data type, and being arranged in frames of the second type, wherein each frame of the second type comprises a frame type identifier for identifying the separate sequences within the second sequence.

According to a further aspect of the invention, the converting means 16 has a second input coupled to a second output of the signal processor 14 for receiving TII, comprised in the Null symbol of a DAB signal. The signal processor 14 also supplies the relative field strength as measured from the FFT of the Null symbol, and if desired, also the values of the in-phase and quadrature components of selected carrier pairs. The converting means 16 then may insert the TII and the other data, supplied by the signal processor 14, into the second sequence. How this is done, is described in more detail further on when dealing with the contents of the frames in the second sequence.

According to another aspect of the invention, which even may be seen separate from the previous aspects of the invention, the converting means 16 has a third input coupled to the second output of the audio decoder 10, which provides the PAD. This PAD is then also inserted into the sequence. This can be done similar as with the TII and associated data, providing a separate data type identifier for PAD and inserting the PAD in a separate packet. This is not described in further details. In a preferred embodiment, which is described in more detail further on, the PAD is inserted into the second sequence in a User Data channel if the frames of the second type are frames according to the IEC958 format.

Another name for the converting means 16 is supplying means, as the converting means in fact supplies the second sequence of data to the outside world, a.o. peripheral devices, etc.

FIG. 3A is a diagram of a frame of the second sequence according to an embodiment of the invention. In the present invention, the first sequence of data is converted into a second sequence of data, having a frame length differing from the frame length in the first sequence. In an embodiment, the frame length in the second sequence is chosen to be 24 bits, wherein the first 20 bits b0..b19 are reserved for data (DT), and bits b20..b23 for a frame type identifier (FTI). This choice allows the frame of the second sequence to be incorporated in a sub-frame according to the IEC958 standard. For more details on this standard, reference is made to document "Digital Audio Interface", International Standard IEC 958, published by Bureau Central de la Commission Electrotechnique Internationale, Switzerland, 1989.

FIG. 3B is a diagram of an IEC958 sub-frame. The IEC958 comprises a 4-bit preamble PR, a 4-bit field for auxiliary data AXD, a 20-bit field for audio data AD and four 1-bit fields: a Validity flag bit V, a User Data channel bit U, a Channel Status bit C and a parity bit P. The Channel Status bit C carries one bit of a Channel Status word, giving information on the data carried in a channel. The User Data channel bit U carries a bit of the User Data channel. When the frame of the second sequence is incorporated in the IEC958 sub-frame, it is carried in bit locations a4..a27. The Validity Flag bit V should then be set at "1" to avoid accidental decoding by an audio decoder. In the Channel Status word, the status should be set to "non-audio" (bit 1 of byte 0), "copyright" should be asserted (bit 2 of byte 0="0"). Bits 3, 4 and 5 of byte 0 shall be set to "000", and bits 6 & 7 of Byte 0 shall be set to Mode 0 (="00"). The category code "001" for Broadcast reception of digital audio shall be used (bits 0, 1, 2 of byte 1="001"). The generation status bit shall be set to "original" (bit 7 of byte 1="0"). In byte 2 the source number and channel number shall be "unspecified" (byte 2="00000000"). The sampling frequency shall be 48 kHz (bits 0, 1, 2, 3 of byte 3="0100"). The clock accuracy of +1000 ppm shall be "Level II" (bits 4, 5 of byte 3="00"). Thus it is recommended to set the first four bytes of the Channel Status word as follows: byte 0 at "01000000", byte 1 at "00100100", byte 2 at "00000000" and byte 3 at "01000000". Bits 3, 4, 5, 6 in byte 1 are set to "0010", which is a proposal for an entry "DAB" to be defined in the category "Broadcast reception".

Table 1 shows an example for the values of bits b20..b23 of the frame type identifier.

TABLE 1

Values of the frame type identifier bits b20..b23.

| b20..b23 | Frame type |
|---|---|
| 0000 | Padding |
| 0001 | Header of data |
| XX10 | Continuation of data |
| 0100 | End of data |
| 0101 | Frame synchronization |
| 0111 | Start of TII data (low capacity data transfer) |
| 1111 | Data (low capacity data transfer) |

Frame type identifier values "0001", "XX10", "0100" and "0111" denote a data transfer in packets. The values "0001" and "0111" signal the start of a packet, wherein the value "0111" even identifies the data type in the packet as well, the value "XX10" signals a continuation of the packet, and the value "0100" signals the end of the packet. An advantage of data transfer in packets is that only little overhead is used, as only a header frame—and possibly a trailer frame—are used as overhead, signalling, for example, the data type and the length of the packet. This high capacity data transfer is especially useful in combination with future channel decoders 8, that can decode the complete DAB data.

Frame type identifier value "XX10" means that the values of bits b20 and b21 do not matter. This is especially useful if the 20 data bits, provided by bits b0..b19, are not sufficient and one or two more data bits are needed in a continuation frame. In this case, bits b20 and b21 are added to the data bits, thereby realizing a data field of 22 bits. If bits b20 and b21 are not used as data bits, depending on the data type in the packet, they should preferably set at "00". For example, in the case of MSC data, the bits b20 and b21 are added to the data field, whereas in the case of FIC or TII data, the bits b20 and b21 are part of the frame type identifier.

Frame type identifier value "1111" signals a frame comprising data and its data type identifier. As each frame comprises such an identifier, it is possible to process each frame independently from the other. This makes processing of frames at the receiving end very easy at the cost of a large overhead, as now all frames need to contain a data type identifier.

Frame type identifier value "0000" signals a padding frame, comprising on all positions b0..b19 normally only a logical "0". This frame type is used when no data is ready to be transferred, and ensures a continuous flow of frames in the second sequence when no data is present.

Frame type identifier value "0101" signals the start of a frame in the first sequence, i.e., a logical DAB frame for example. This frame may contain on its remaining bit locations b0..b19 some information. To this extend, bits b0..b3 are reserved for a Synchronization Frame Contents Indicator SFCI, in this case, for example having a value of "0001", indicating that a Contents Field CF, i.e., the remaining bits b4..b19, contains the number of corrected errors detected by re-encoding of the FIC of the previous DAB frame. Other values of bits b0..b3 are reserved.

In case of the low capacity data transfer (using TII frame type identifier values "0111", in association with "XX10" and "0100", and frame type identifier value "1111"), the frames having frame type identifier value "1111" are, for example, transmitted in channel A of the IEC958 format and the TII frames, if at all, are then transmitted in channel B of the IEC958 format. The low capacity data transfer is especially useful in combination with the presently used channel decoder 8, as only a limited amount of data need be transported.

Thus, the converting means 16 puts the TII and associated data either in a packet for a high capacity data transfer, or in a packet for a low capacity data transfer. The same goes for the other data, such as MSC data and FIC data. It may be clear that the above is to be interpreted only as an illustration and not intended to delimit the invention.

As indicated in Table 1, there are frame type identifiers for a low capacity data transfer. These have the values "1111" and "0111" (with its associated values "XX 10" and "0100" for indicating the remainder of a packet).

Frames having a frame type identifier value "1111" comprise 8 bits of data DT, preferably at bit locations b8..b15 in the frame of FIG. 3A. A data type identifier DTI is added to the frame at bits b6, b7, for denoting the origin of the data and for indicating the use of a 6-bit field IDF in bits b0..b5 of the frame, as illustrated in Table 2.

TABLE 2

Data type identifier bits b6, b7 in a "1111" frame.

| b6 b7 | Data type and content of IdField |
|---|---|
| 00 | not signalled, IdField reserved |
| 01 | MSC, IdField contains SubChId |
| 10 | FIC, IdField is reserved |
| 11 | reserved, IdField is reserved |

The SubChId is an identifier for identifying a subchannel within the MSC, as explained previously. The channel decoder 8 of FIG. 1 may provide window signals together with the DAB data sequence. Such a window signal is set active at the times during which data is present in the DAB data sequence, which belong to a certain data type. For example, a control unit has derived from the FIC, that a particular subchannel is present in Capacity Units 6, 7 and 8 of the MSC. Now, the control unit instructs the channel decoder 8 to activate window signal 1 at the time that decoded data from Capacity Units 6, 7 and 8 are present on the output of the channel decoder 8. Now, the window signal 1 signals the presence of decoded data from Capacity Units 6, 7 and 8 on its output and the control unit knows that this data is associated with the particular subchannel number. In the frame format, 16 different window signals from the channel decoder can be distinguished by providing a 4-bit window signal identifier at bit locations b16..b19 in the frame. A window signal can be linked to a subchannel by inserting the SubChld in the IdField at bit locations b0..b5 of the frame, in the case of data coming from the MSC. In other cases, the IdField is reserved. One of the window signals may be used for padding, indicating that no data is available.

Frame type identifier value "0111" denotes the header of a TII information packet for the low capacity data transfer, thus also functioning a data type identifier. Frames having frame type values "XX10" and "0100" carry data. In the header frame (value "0111") a 5-bit word at bit locations b11..b 15 is reserved for indicating the Number of Received Transmitters (NRT). NRT can range from 1 to 24. The other values are reserved. There are (NRT-1) continuation frames and one trailer frame and they are filled as follows. Each of these frames comprises a 5-bit Subld at bit locations b8..b12 and a 7-bit Mainld at bits b13..b19, the Mainld and Subld being known from subsection 8.1.9 of document "Radio Broadcast Systems; Digital Audio Broadcasting (DAB) to mobile, portable and fixed receivers.", ETS 300 401, published by the European Telecommunications Standards Institute, Sophia Antipolis, 1995. Furthermore, 3 bits (b5..b7) are reserved to indicate a relative Field strength, ranging from "001" indicating a very weak signal, to 111 indicating a very strong signal. The value "000" denotes "not signalled". The remaining bits b0..b4 are reserved. As mentioned before, the last data frame has frame type identifier value "0100", but contains the same kind of data as the continuation frames as no specific trailer frame is needed.

In the low capacity data transfer the TII frames can be alternated with the data frames having frame type 1111. Padding frames can be inserted at will.

Frame type identifier value "0001" identifies a header frame of packets for a high capacity data transfer. For this purpose, bits b18 and b19 in the header frame constitute a data type identifier and are reserved for indicating the data type contained in the packet, as shown in Table 3.

TABLE 3

Data type identifier bits b18, b19 in a "0001" frame.

| b18 b19 | Data type |
|---|---|
| 00 | MSC |
| 01 | FIC |
| 10 | TII |
| 11 | reserved |

Frame type identifier value "XX10" signals a continuation frame, i.e., a frame being part of a packet and frame type identifier value "0100" can be regarded as a trailer frame, signalling the end of a packet.

In the case of MSC data being transmitted (b18=0 b19=1), the header frame may comprise in bits b0..b11, the number M of RDI frames, i.e. the length of the packet, and in bits b12..b17, the SubChannel Identifier. The continuation frames all carry data. The penultimate frame in the packet comprises data and padding bits as the total number of data bits may not correspond to the total number of available data bits in the packet. The trailer frame comprises a 16 bit field, which specifies the number of corrected errors detected by re-encoding. Exceptionally, the code "1111 1111 1111 1111" shall indicate that this information is not signalled. In the case of MSC data being transmitted, the frame type identifier having a value of "XX 10" is preferably shortened to just the last two bits: "10". From Table 1, it may be clear that these last two bits are sufficient for recognizing a continuation frame. This results in an extra 2 bits (b20 and b21) for data, thus extending the data field from 20 bits to 24 bits. In other cases, where the 2 extra data bits are not needed, these data bits are set to "00".

In the case of FIC data being transmitted (b18=0 b 19=1), the header frame comprises two bits indicating the DAB transmission mode, for example bits b14 and b15. Table 4 shows the values of bits b14 and b15 and the associated DAB transmission mode.

TABLE 4

DAB transmission mode bits b14, b15 in FIC header frame.

| b14 b15 | DAB transmission mode |
|---|---|
| 00 | reserved |
| 01 | Mode I (12 FIBs per 96 ms in a 24 ms burst) |
| 10 | Mode II (3 FIBs per 24 ms) |
| 11 | Mode III (4 FIBs per 24 ms) |

In the FIC header frame, 4 bits (for example: bits b10..b13) are reserved for an FIB-number. In DAB transmission modes II and III, the FIB-number field is coded as an unsigned binary number specifying the FIB. In Table 5, the coding of the FIB-number is given.

TABLE 5

Coding of the FIB-number bits b10..b13 in mode I.

| b10..b13 | FIB-number |
|---|---|
| 0000 | FIB 1, 1 |
| 1000 | FIB 1, 2 |
| 0100 | FIB 1, 3 |
| 1100 | FIB 2, 1 |
| . . . | |
| 1101 | FIB 4, 3 |

The trailer frame with frame type identifier value "0100" contains in the case of an FIC packet the following. Three bits (for example, bits b16..b18) are reserved for an Error Indication Type (EIT), specifying the kind of data carried in a 16 bit Error Check Field (ECF), (for example, bits b0..b15). Table 6 shows the codes for the EIT and the related contents in the ECF.

TABLE 6

Coding of the EIT bits b16..b18 and the related ECF.

| EIT (b16..b18) | Meaning + contents ECF |
|---|---|
| 000 | No error indication; ECF is reserved |
| 100 | CRC performed, no errors; ECF is reserved |
| 010 | CRC performed, errors detected; ECF contains CRC as received |

TABLE 6-continued

Coding of the EIT bits b16..b18 and the related ECF.

| EIT (b16..b18) | Meaning + contents ECF |
|---|---|
| 110 | CRC performed; EDF contains bitwise sum of received and locally calculated CRC |

In DAB transmission mode I, the 12 FIBs contained in one transmission frame may be conveyed in a single, once every 96 ms, or as four series of 3 FIBs at 24 ms intervals.

In the case of TII data being transmitted (b18=1 b19=0), the header frame further comprises a TII format identifier, in this example comprising 3 bits b8..b10. The TII format identifier having a value of "010" denotes a basic format and the value "001" denotes an extended format. Just like in the low capacity format (frame type identifier value="0111"), bits b11..b15 contain the NRT.

In the basic format (b8..b10 in the header being equal to "010"), the remainder of the TII packet is the same as in the low capacity format.

In the extended format (b8..b10 in the header being equal to "001"), the first NRT continuation frames are filled similar as in the basic format, but now bits b1..b4 are used as follows. Bit b1 is a Null Symbol Indicator which changes when data from a new null symbol is transmitted for the first time. In the extended format, the complex results of the discrete Fourier Transform as performed in the FFT processor 6 of FIG. 1 on the samples of the Null symbol of selected pairs of carriers are provided. To this effect, bits b2..b4 denote the number of carrier pairs (NCP) for which information is provided for the transmitter identified by the Mainld and the Subld. In the continuation frames following the number of NRT frames as described above, 16 bits contain, coded as two's complement, the real or imaginary part of the FFT result on the samples of the Null symbol for each the number of carrier pair as denoted by NCP for each transmitter as identified in the number of NRT frames.

The temporal order of transmission of data from MSC Subchannels, the FIC and TII in any format is arbitrary. Padding frames may be inserted at any position. However, as a rule: all data which is related to one logical DAB frame shall be sent within the interval defined by two consecutive transmissions of a synchronization frame. TII data may be sent in several packets if so desired. TII information for each carrier pair shall be transmitted preferably only once per evaluated Null symbol. However, this information may be split over several logical frames. The start of a new data set is indicated by a new value of the Null Symbol Indicator.

In the first sequence, no TII data is present other than the one already incorporated in the FIC. A DAB signal also contains TII data in its Null symbol at the start of each DAB frame. In the present invention, this TII data together with data relating to the relative fieldstrength of the received transmitters is retrieved from the FFT processor 6, and inserted into the second sequence.

In the first sequence, PAD data is embedded together with audio information on the bit stream. For retrieving this PAD data, it is necessary to retrieve first the audio frames and then to retrieve the PAD data therefrom. This is an elaborate operation costing extra hardware. In most DAB receivers, audio decoding means are present, which also retrieve the PAD data from the audio frames. According to the invention, this can be used advantageously by inserting this PAD into the second sequence as a separate sequence. This makes it much easier for a peripheral device, receiving the second sequence, to retrieve the PAD data from the second sequence as no audio decoding means is required.

FIG. 4 shows an example of the structure of a PAD message for use in a receiver according to the invention, wherein the PAD is retrieved and inserted into the second sequence. The PAD message comprises:

a header (HDR) for signalling that the message has the structure as described below, a length indicator (LI), specifying the number of bytes that follow in the PAD message, a two-byte field (F-PAD) carrying the F-PAD as defined in ETS 300 401. The two F-PAD bytes are contained in their logical order, and if provided, a further field (X-PAD) carrying a number of bytes from the X-PAD field as defined in ETS 300 401. These bytes are also contained in their logical order.

Both header and length indicator are preferably a one-byte field, where the header should contain the hexadecimal value "AD" for identifying the message structure. The X-PAD field is optional; its presence and length can be derived from the Length Indicator LI. It is noted here that the DAB receiver may provide more bytes in the X-PAD field than those that actually contain X-PAD data; in that case, the DAB receiver just conveys bytes from the end of an audio frame without distinction whether these contain audio data or PAD.

In a preferred embodiment, the PAD messages can be conveyed in the User Data channel of the IEC958 interface. This means that the information is to be carried on Information Units (IU), each IU comprising 8 bits, the first one being a Start Flag (SF), always being set at "1", followed by 7 information bits. A User Data message comprises a header of three IU's and a number of data IU's.

Figure 5A:
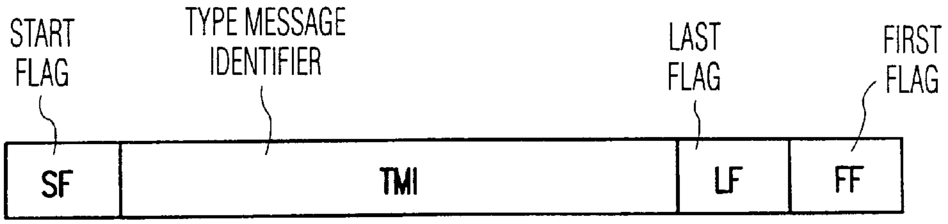
FIG. 5A is a diagram of the first header IU of a User Data message.

FIG. 5A is a diagram of the first header IU of a User Data message. The first IU comprises first a five-bit field, carrying an identifier for identifying the type of message (TMI). Preferably, this field carries the binary number "10010". It further comprises a Last Flag bit (LF), set at "1" if this message is the last of a series of User Data Messages, that together convey one PAD message. Otherwise, it shall be set at "0". Finally, it also comprises a First Flag bit (FF), which shall be set if this message is the first of a series of User Data Messages that together convey one PAD message. Otherwise, it shall be set at "0".

Figure 5B:
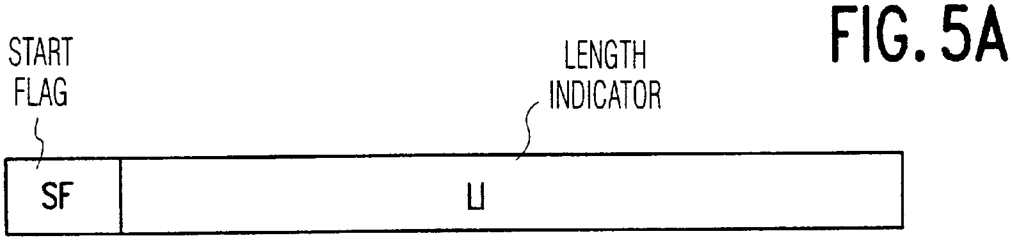
FIG. 5B is a diagram of the second header IU of a User Data message.

FIG. 5B is a diagram of the second header IU of a User Data message. The second IU in the header comprises the message length indicator (LI) of 7 bits. Note, that the third header IU is included in this length value.

Figure 5C:
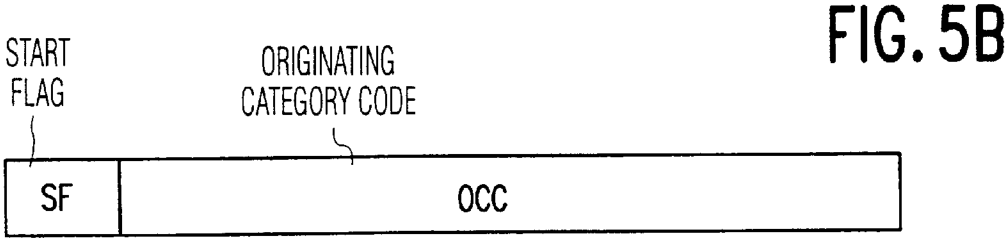
FIG. 5C is a diagram of the third header IU of the User Data message.

FIG. 5C is a diagram of the third header IU of the User Data message. The third IU in the header comprises a 7 bit field (OCC), which preferably duplicates the Originating Category Code of the Channel Status (bits b0..b6 of byte 1) of the IEC958 format.

Figure 5D:
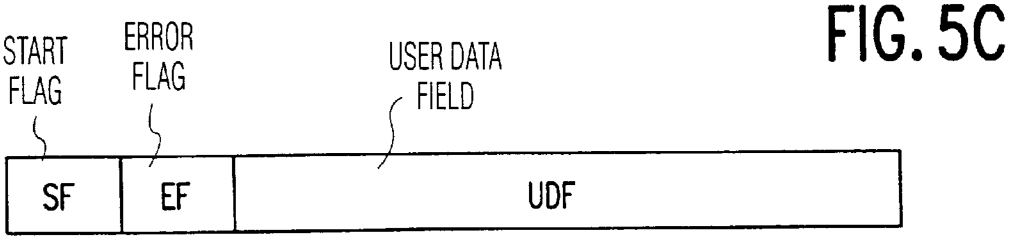
FIG. 5D is a diagram of a data IU of the User Data message. In the figures, identical parts are provided with the same reference numbers.

FIG. 5D is a diagram of a data IU of the User Data message. If the IU carries data, i.e., part of the PAD messages, then the remaining 7 bits can be used for data in the user data field (UDF). In a preferred embodiment, the second bit in the IU (=the first bit of the 7-bit user data field) can be reserved for an error flag (EF) signalling whether an error was detected in the following six user data bits. Thus, a User Data IU can preferably convey 6 bits of user data in the user data field (UDF), and even 7 bits if the error flag is dispensed with. The last UDF in a message may comprise a number of padding bits if less than 6 (or 7) bits are provided.

IU's within a User Data message may be separated by padding bits having a logical value of "0", with a maximum of 8 padding bits, as a bit having a value of "1", following 9 consecutive bits having a logical value of "0" is recognized as the start of a new User Data message. Padding between IU's belonging to different User Data messages is not restricted to a maximum length, as long as its length is at least 9 bits. PAD message not fitting into a single User Data message can be split into several User Data messages. The splitting of the PAD message need not be at a byte-boundary. The header of the User Data message indicates that the message contains DAB-PAD, the length of the User Data message and whether the message is the start, continuation or end of a series of messages, together building a PAD message.

The example given above of additionally inserting the PAD messages in the IEC958 User Data channel is especially advantageous for the following reasons. Electronic circuits are readily available, which are adapted to the encoding and decoding of data in the User Data channel, separately from the encoding and decoding of other data. This is very advantageous for reducing the encoding/decoding complexity, especially for those peripheral devices that need to access only the PAD.

The examples given are merely intended as an illustration of the present invention. The embedded data need not be restricted to PAD in DAB data. Furthermore, the PAD may also be provided in other bit streams not conforming to the IEC958 and in another structure as well, without deviating from the scope of the present invention.

What is claimed is:

1. A receiver for receiving a Digital Audio Broadcast (DAB) signal, comprising means for decoding a received DAB signal into a first sequence of data organized in frames of a first type, said frames comprising a plurality of data types at predetermined locations within the frame, characterized in that the receiver further comprises means for converting the first sequence of data into a second sequence of data organized in frames of a second type, a frame length of the first type of frames being different from a frame length of the second type of frames, said converting means being coupled to the decoding means and comprising:

means for disassembling the first sequence of data into at least two separate sequences of data, each of the separate sequences of data being reserved for a predetermined data type;

means for dividing the separate sequences of data into frames of the second type;

means for arranging the separate sequences of data into frames of the second type, each frame having a frame type identifier for identifying the separate sequences of data within the second sequence of data; and means for further assembling the second sequence of data out of the separate sequences of data.

2. The receiver as claimed in claim 1, characterized in that the converting means adds a data type identifier to at least one of the separate sequences of data for identifying the data type in the separate sequence of data.

3. The receiver as claimed in claim 1, characterized in that the second sequence of data comprises a plurality of packets, wherein a separate sequence of data comprises a packet, comprising a plurality of frames in the second sequence of data, a packet being identified by predetermined values of the frame type identifier, said packet having a header containing the data type identifier.

4. The receiver as claimed in claim 1, characterized in that the second sequence of data comprises single data frames identified by at least one further predetermined value of the frame type identifier, wherein each frame in the second sequence of data comprises data and a data type identifier.

5. The receiver as claimed in claim 1, characterized in that the converting means adds a synchronization signal to the second sequence of data for signalling a start of a frame of the first type.

6. The receiver as claimed in claim 5, characterized in that the synchronization signal is a frame having a frame type identifier with a predetermined value.

7. The receiver as claimed in claim 1, characterized in that a frame of the second sequence of data comprises at least 20 bits for data from the first sequence of data and, at most, 4 bits for the frame type identifier, a total frame length being 24 bits.

8. The receiver as claimed in claim 7, characterized in that depending on a data type, a frame comprises 20 bits for data and 4 bits for the frame type identifier, or 22 bits for data and 2 bits for the frame type identifier.

9. The receiver as claimed in claim 7, characterized in that the frame is embedded in a sub-frame according to the IEC958 standard.

10. The receiver as claimed in claim 1, wherein the receiver comprises means for decoding data, embedded in a Digital Audio Broadcast (DAB) signal, characterized in that the converting means adds the decoded data from the means for decoding data as a separate sequence of data to the second sequence of data.

11. The receiver as claimed in claim 10, characterized in that the decoded data is Transmitter Identification Information (TII) data comprised in a null symbol of the DAB signal.

12. The receiver as claimed in claim 10, characterized in that the decoded data is Program Associated Data (PAD) data.

13. The receiver as claimed in claim 12, characterized in that a frame of the second sequence of data is embedded in a IEC958 sub-frame, and in that the converting means inserts the separate sequence of data comprising PAD data into a User Data channel in the IEC958 sub-frame.

14. An apparatus for converting a first sequence of data organized in frames of a first type, said frames comprising a plurality of data types at predetermined locations within the frame, into a second sequence of data organized in frames of a second type, a frame length of the first type of frames being different from a frame length of the second type of frames, said converting apparatus comprising:

means for disassembling the first sequence of data into at least two separate sequences of data, each of the separate sequences of data being reserved for a predetermined data type;

means for dividing the separate sequences of data into frames of the second type;

means for arranging the separate sequences of data into frames of the second type, each frame having a frame type identifier for identifying the separate sequences of data within the second sequence of data; and means for further assembling the second sequence of data out of the separate sequences of data.

15. A method for converting a first sequence of data organized in frames of a first type, said frames comprising a plurality of data types at predetermined locations within the frame, into a second sequence of data organized in frames of a second type, a frame length of the first type of frames being different from a frame length of the second type of frames, said method comprising the steps:

reading a first sequence of data organized in frames of a first type;

disassembling the first sequence of data into at least two separate sequences of data, each of the separate sequences of data being reserved for a predetermined data type;

dividing the separate sequences of data into frames of a second type;

arranging the separate sequences of data into frames of the second type, each frame having a frame type identifier for identifying the separate sequences of data within the second sequence of data; and assembling the second sequence of data out of the separate sequences of data.

16. The method as claimed in claim 15, characterized in that a data type identifier is added to at least one of the separate sequences of data for identifying the data type in the separate sequence of data.

17. The method as claimed in claim 15, characterized in that the second sequence of data comprises a plurality of packets, wherein a separate sequence of data comprises a packet comprising a plurality of frames in the second sequence of data, a packet being identified by predetermined values of the frame type identifier, said packet having a header containing the data type identifier.

18. The method as claimed in claim 15, characterized in that the second sequence of data comprises single data frames identified by at least one further predetermined value of the frame type identifier, wherein each frame in the second sequence of data comprises data and a data type identifier.

19. The method as claimed in claim 15, characterized in that a synchronization signal is added to the second sequence of data for signalling a start of a frame of the first type.

20. The method as claimed in claim 19, characterized in that the synchronization signal is a frame having a frame type identifier with a predetermined value.

21. The method as claimed in claim 15, characterized in that a frame of the second sequence of data comprises at least 20 bits for data from the first sequence of data and, at most, 4 bits for the frame type identifier, a total frame length being 24 bits.

22. The method as claimed in claim 21, characterized in that depending on a data type, a frame comprises 20 bits for data and 4 bits for the frame type identifier, or 22 bits for data and 2 bits for the frame type identifier.

23. The method as claimed in claim 21, characterized in that the frame is embedded in a sub-frame according to the IEC958 standard.

24. The method as claimed in claim 15, wherein the first sequence is retrieved from a Digital Audio Broadcast (DAB) signal, and wherein data, embedded in a DAB signal, is decoded, characterized in that the decoded data is added as a separate sequence of data to the second sequence of data.

25. The method as claimed in claim 24, characterized in that the decoded data is Transmitter Identification Information (TII) data comprised in a null symbol of the DAB signal.

26. The method as claimed in claim 24, characterized in that the decoded data is Program Associated Data (PAD) data.

27. The method as claimed in claim 26, characterized in that a frame of the second sequence of data is embedded in a IEC958 sub-frame and in that the separate sequence of data comprising PAD data is inserted into a User Data channel in the IEC958 sub-frame.

* * * * *